United States Patent
Park et al.

(10) Patent No.: US 11,729,183 B2
(45) Date of Patent: Aug. 15, 2023

(54) SYSTEM AND METHOD FOR PROVIDING SECURE IN-VEHICLE NETWORK

(71) Applicants: Hyundai Motor Company, Seoul (KR); Kia Motors Corporation, Seoul (KR)

(72) Inventors: Seung Wook Park, Seoul (KR); Seil Kim, Seoul (KR); Aram Cho, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 396 days.

(21) Appl. No.: 16/769,779

(22) PCT Filed: Dec. 19, 2018

(86) PCT No.: PCT/KR2018/016243
§ 371 (c)(1),
(2) Date: Jun. 4, 2020

(87) PCT Pub. No.: WO2019/124976
PCT Pub. Date: Jun. 27, 2019

(65) Prior Publication Data
US 2021/0176259 A1   Jun. 10, 2021

Related U.S. Application Data

(60) Provisional application No. 62/607,595, filed on Dec. 19, 2017.

(51) Int. Cl.
*H04L 9/40* (2022.01)
*G06F 16/2455* (2019.01)

(52) U.S. Cl.
CPC ...... *H04L 63/1408* (2013.01); *G06F 16/2455* (2019.01); *H04L 63/1416* (2013.01); *H04L 63/1425* (2013.01)

(58) Field of Classification Search
CPC ............. H04L 63/1408; H04L 63/1416; H04L 63/1425; H04L 2012/4021; H04L 2012/40215; G06F 16/2455
See application file for complete search history.

(56) References Cited

U.S. PATENT DOCUMENTS 9,294,487 B2 *   3/2016   Curnyn .................. G06F 21/566
10,262,137 B1 *   4/2019   Hart .................... H04L 63/1416
(Continued)

FOREIGN PATENT DOCUMENTS

CN   105050868 A   11/2015
CN   105791266 A   7/2016
(Continued)

OTHER PUBLICATIONS

Chinese Office Action for Chinese Application No. 2018800784710, dated Apr. 26, 2022, 20 pages, with English translation.
(Continued)

*Primary Examiner* — Ali S Abyaneh
(74) *Attorney, Agent, or Firm* — Fox Rothschild LLP

(57) ABSTRACT

A system and a method of providing security to an in-vehicle network are provided. The method efficiently operates multiple detection techniques to reduce the required system resources while maintaining robustness against malicious message detection.

6 Claims, 14 Drawing Sheets

(56) References Cited

U.S. PATENT DOCUMENTS

| | | | |
|---|---|---|---|
| 10,931,634 B2* | 2/2021 | Maeda | G06F 21/85 |
| 2012/0174224 A1* | 7/2012 | Thomas | G06F 9/45533 |
| | | | 726/24 |
| 2013/0227689 A1 | 8/2013 | Pietrowicz et al. | |
| 2015/0271201 A1 | 9/2015 | Ruvio et al. | |
| 2015/0373054 A1 | 12/2015 | Chapman, II et al. | |
| 2016/0205117 A1 | 7/2016 | Laifenfeld et al. | |
| 2016/0381055 A1* | 12/2016 | Galula | H04L 63/14 |
| | | | 726/23 |
| 2017/0013005 A1 | 1/2017 | Galula et al. | |
| 2017/0286675 A1 | 10/2017 | Shin et al. | |

FOREIGN PATENT DOCUMENTS

| | | |
|---|---|---|
| CN | 106878130 A | 6/2017 |
| CN | 109150846 A | 1/2019 |
| JP | 2016045736 A | 4/2016 |
| KR | 10-2015-0073176 A | 6/2015 |
| WO | 2014/061021 A1 | 4/2014 |

OTHER PUBLICATIONS

Extended European Search Report for Application No. 18890045.0, dated Dec. 16, 2021, 16 pages.

Partial Supplementary European Search Report received for EP Application No. 18890045.0, dated Aug. 20, 2021, 18 pages.

Haas et al. (May 14, 2017) "Automotive Connectivity, Cyber Attack Scenarios and Automotive Cyber Security", 2017 IEEE International Conference on Electro Information Technology (EIT), IEEE, 635-639.

Trifonov et al. (Aug. 24, 2017) "Adaptive Optimization Techniques for Inteligent Network Security", 2017 Fourth International Conference on Mathematics and Computers in Sciences and in Industry (MCSI), IEEE, 219-223.

\* cited by examiner

SYSTEM AND METHOD FOR PROVIDING SECURE IN-VEHICLE NETWORK

CROSS-REFERENCE TO RELATED APPLICATION

This patent application is a National Stage Application filed under 35 U.S.C. § 371, of International Application No. PCT/KR2018/016243, filed Dec. 19, 2018, which claims priority to U.S. 62/607,595, filed Dec. 19, 2017, which is hereby incorporated by reference in its entirety.

TECHNICAL FIELD

The present disclosure, in some embodiments, relates to providing security to an in-vehicle network.

BACKGROUND

The statements in this section merely provide background information related to the present disclosure and do not necessarily constitute prior art. Intrusion Detection System (IDS) and Intrusion Protection System (IPS) have been widely used in network security. The IDS monitors network activity and detects suspicious behavior. The IPS refers to a system that has the function or capability to respond to a detected intrusion by, for example, blocking a signal that may affect the system. IDS and IPS are generally used together into such a system referred to as an Intrusion Detection and Prevention System (IDPS).

An ever-increasing number of electronic control devices (ECUs) are being installed in a vehicle which connect via a wireless network to an external network, and in concert therewith, IDS or IDPS are being introduced to detect and deal with the security threat to the internal network of the vehicle.

SUMMARY

The present disclosure provides efficient methods of operating a plurality of detection schemes to reduce required system resources while maintaining robustness against malicious message detection. In addition, the present disclosure provides various methods of loading IDS or IDPS in an Automotive Open System Architecture (AUTOSAR)-based software architecture.

At least one aspect of the present disclosure provides a method of providing security to an in-vehicle network that may include determining whether a new network message collected from the in-vehicle network and a pre-detected security threat message are identical or similar to each other, and skipping applications of multiple detection techniques to the new network message and immediately considering the new network message as a security threat message, in response to determining that the new network message and the pre-detected security threat message are identical or similar to each other. Accordingly, the overall operation speed may be improved by skipping unnecessary detection process, thereby improving overall detection efficiency.

Another aspect of the present disclosure provides a method of providing security to an in-vehicle network that may include determining an application order of multiple detection techniques to apply to a new network message collected from the in-vehicle network, and applying the multiple detection techniques to the new network message in a determined application order and determining whether the new network message is a security threat message. The application order of the multiple detection techniques may be determined based on a history of detection of the multiple detection techniques applied to at least one network message previously collected from the in-vehicle network. Accordingly, when an attack in a similar manner is consecutively attempted, an attack message may be more detected more rapidly compared to using a fixed application order.

Yet another aspect of the present disclosure provides a method of providing security to an in-vehicle network that may include initiating parallel applications of multiple detection techniques to a collected network message from the in-vehicle network, and in response to any one detection technique of the multiple detection techniques determining the collected network message as a security threat message, stopping remaining detection techniques from being applied to the collected network message. Accordingly, the detection procedure may be completed more rapidly compared to sequentially applying multiple detection techniques.

The methods described above may be performed by at least one electronic apparatus that includes at least one processor and a memory in which instructions are recorded. For example, the instructions, when executed by the at least one processor, cause the electronic apparatus to perform the methods described above.

As described above, with the provided methods and electronic apparatuses, robustness may be maintained for malicious message detection while rapidly detecting an attack message, thereby reducing system resources required for detection.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
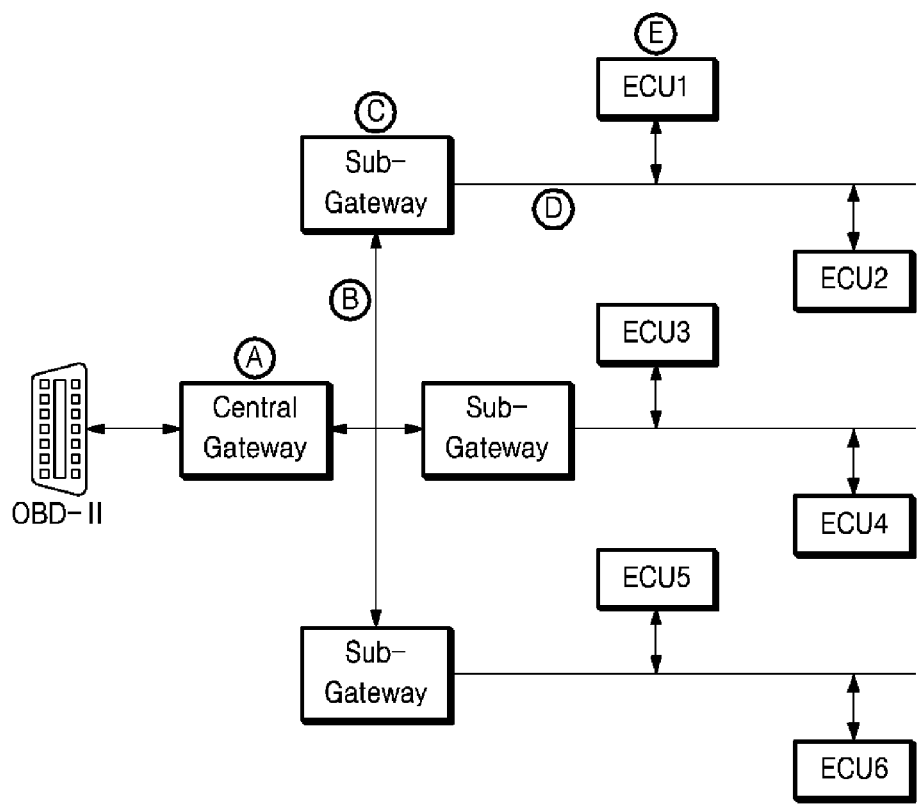
FIG. 1 illustrates locations where an IDS or IDPS may be deployed on a Controller Area Network (CAN).

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely for the purpose of differentiating one component from the other, not to imply or suggest the substances, the order or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

FIG. 1 illustrates locations such as at Ⓐ, Ⓑ, Ⓒ, Ⓓ, and Ⓔ where IDS (or IDPS) may be deployed on a controller area network (or simply CAN). A central gateway shown is a central communication node that operates as a router. The central gateway may be viewed as a gate for all data coming into the vehicle. Sub-gateways are local communication nodes that are each responsible for a specific sub-system domain, such as a power train, chassis, body, multimedia, etc.

The merits and issues of the respective locations are as follows.

Ⓐ At central gateway: Where all CAN domains connect to the outside, an Intrusion Detection and Prevention System (IDPS) may be installed to detect all attacks coming into the network CAN via an OBD port. This allows for identification of a message having an intention of attack in advance. However, with excessive data being collected, it may be difficult to effectively cope with an attack due to the difficulty of distinguishing an intrusive attack to an internal network from a nonintrusive message.

Ⓑ After central gateway: An IDPS may check the message after message filtering by the central gateway. This allows for detection of attackers that are fewer, but more determined than before passing through location Ⓐ. In addition, this allows for detection of hacking by an external hacker directly accessing the backbone network CAN and injecting a malicious message.

Ⓒ At sub-gateway: Where management is performed on CAN massages that are transmitted and received to and from a specific CAN domain, an IDPS may be installed to detect discrepancy between a CAN message at Ⓑ and a CAN message flowing in the specific CAN domain. At this location for detecting an attack directed to another domain from inside the CAN domain, an IDPS may detect an attacker inside the CAN domain with a high level of success.

Ⓓ After sub-gateway: Where hack in the system is undetectable through double gateways with a specific malicious message. However, a malicious message remains detectable when an internal electronic control unit (ECU) has been damaged by an attacker, or when a malicious controller has been introduced and spoofed as a replacement, and when an external entity directly connect to the relevant CAN bus. Therefore, this installation location is satisfactory for when the internal controller is not reliable and monitoring is required against a network hacking of a specific CAN domain to which the controller belongs.

Ⓔ At controller: The controller receives all messages present on the network and selectively processes the necessary messages by checking the ID of the necessary CAN message. The controller analyzes the CAN status message received from the outside of the controller and the context of a command message and implements the messages. This requires the controller to have a high level of security since the controller needs to be protected from both the outside and the inside of the controller. Mounting the IDPS to the controller prevents loss of critical data possessed by the controller or malfunction from a sophisticated internal/external attacker capable of falsifying the controller.

Figure 2:
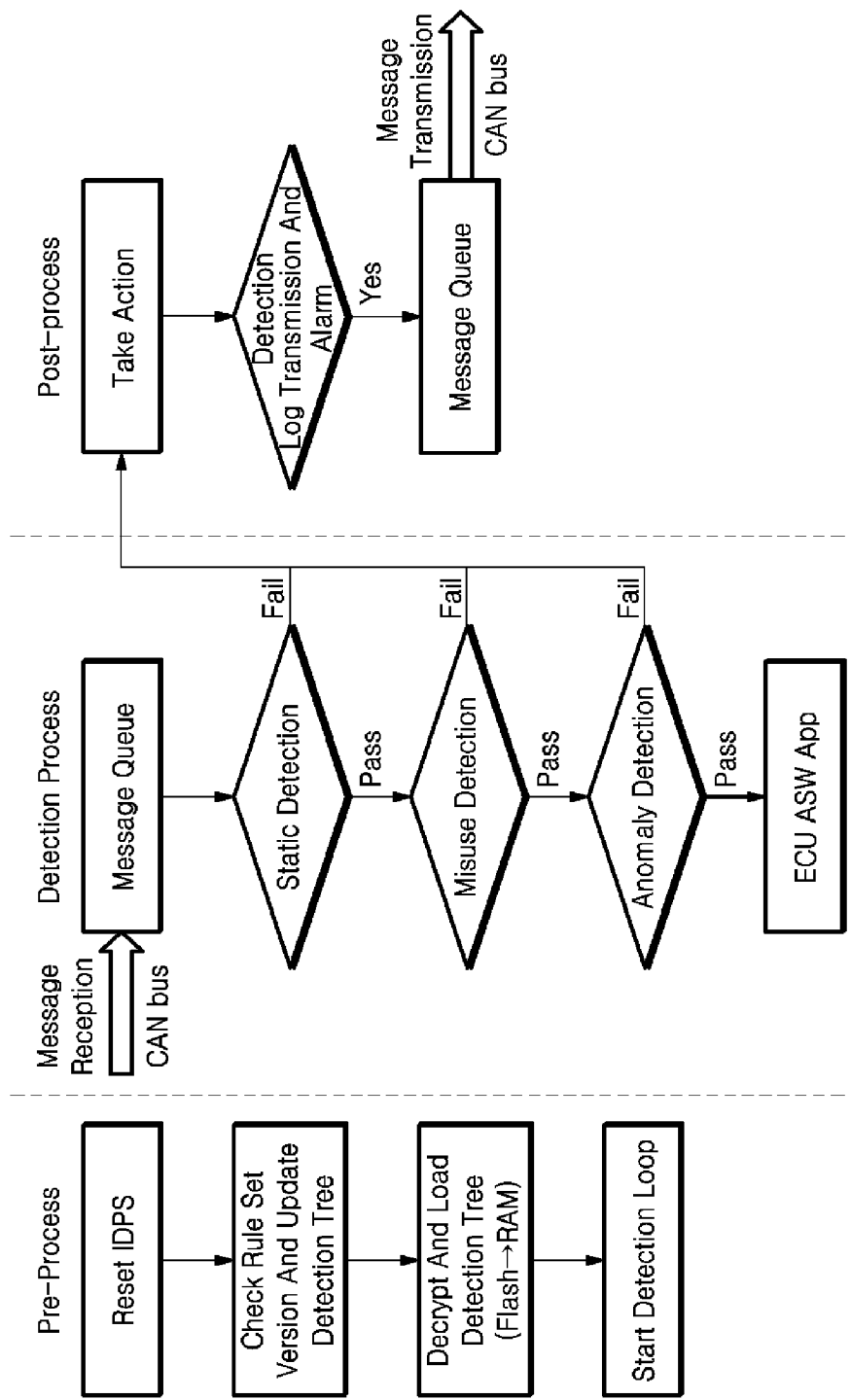
FIG. 2 is a flow diagram of an example operation of an IDPS.

FIG. 2 is a flow diagram illustrating an example operation of an IDPS. The IDPS may be configured to perform a pre-process when the vehicle is turned on, and then repeatedly perform a detection process and a post-process until the vehicle is powered off.

In the pre-process, when restarted, the IDPS checks the version of the detection tree and, in response to determining that the IDPS detection tree currently stored in a flash memory is not the latest version, the IDPS updates the detection tree with, for example, the latest version of the rule set downloaded via the OTA or OBD port. Thereafter, the IDPS decrypts and loads the encrypted detection tree stored in the flash memory into a RAM area. When the pre-process is terminated, a detection process begins, which is a substantial detection operation of the IDPS.

In a detection process, the IDPS may be responsive to a new CAN message arriving at a message queue for sequentially performing static detection, misuse detection, and anomaly detection techniques to determine whether the new CAN message is a network message associated with a security threat, which will be referred to as a 'security threat message', an 'abnormal message', a 'malicious message', an 'attack message', or a message that failed a check or 'failed message'. In the respective techniques, the following checks are performed.

The static detection is a technique for checking the validity of a CAN message by comparing a message ID, a data length code (DLC), a period, and the like with values specified in a CAN database (CAN DB). The misuse detection is a technique for detecting an attack message already known through a vulnerability analysis of a vehicle system and detects the message data when content thereof is classified into a malicious message black list without considering the state of the vehicle. The anomaly detection is a technique for checking whether a relevant message is within a normal message category based on the state of the vehicle and is made through a detection tree based on the state of the vehicle and the command message.

In the post-process, actions are taken such as passing, blocking, logging, or warning based on the results of checking the CAN messages. For example, the IDPS may pass a CAN message that contains a detection log via the CAN network to a gateway or telematics device that may be communicatively coupled to a remote network, to transmit the detection log to the back-end server on the remote network.

The characteristics, merits and issues of the intrusion detection techniques described above are as follows.

The static detection is a technique for monitoring the message ID, message length, message transmission period, etc. and checking validity by comparing the monitored data to predetermined rules. Thus, what may be obtained through the static detection is only a validity check to see conformity to a 'valid message format' that the manufacturer has predetermined and stored in the CAN DB. The static detection is unable to detect malicious data, etc. contained in the message.

The misuse detection is a detection technique by defining the pattern of an attack method or the signature of an attack indicates using a known vulnerability of a system and comparing the resultant traffic. The misuse detection is also referred to as signature-based detection. The misuse detection is advantageous by consuming less resources of the system and has a high probability of detection, but it needs to define a new signature for each new attack, thereby slowing down the handling of the newly emerging attack and requiring a substantial number of security human resources. This technique may result in false negative (type 2 error) problems that may miss an actual attack.

The anomaly detection is a technique for collecting and analyzing ordinary behavior on a network to define a normal pattern and then detecting anomaly behavior beyond a certain threshold off the normal pattern. Anomaly detection is also referred to as profile-based detection. With anomaly detection, even when a new attack occurs, one may detect when such an attack deviates from the normal pattern, and requires minimal security resources compared to the misuse detection method. However, a number of system resources may be required, and false positives (e.g., one or more errors) may occur according to a predetermined threshold value.

According to the illustrated operation of FIG. 2, each message stacked in a message queue undergoes the detection process composed of three detection techniques (i.e., static detection→misuse detection→anomaly detection) to determine blocking or passing the message. The normal CAN message is also supposed to undergo the detection process composed of the three techniques before it may be transmitted to the software application of the ECU.

The present disclosure provides various methods of efficiently operating multiple detection techniques to reduce required system resources while maintaining robustness against malicious message detection.

First Embodiment—History-Based Detection Process Skip Method

The method skips application of the multiple techniques to a new message collected from the vehicle network when it is the same or similar message as a security threat message that failed to pass the previously performed detection process, thereby allowing the message blocking determination and blocking action to be performed rapidly.

Figure 3:
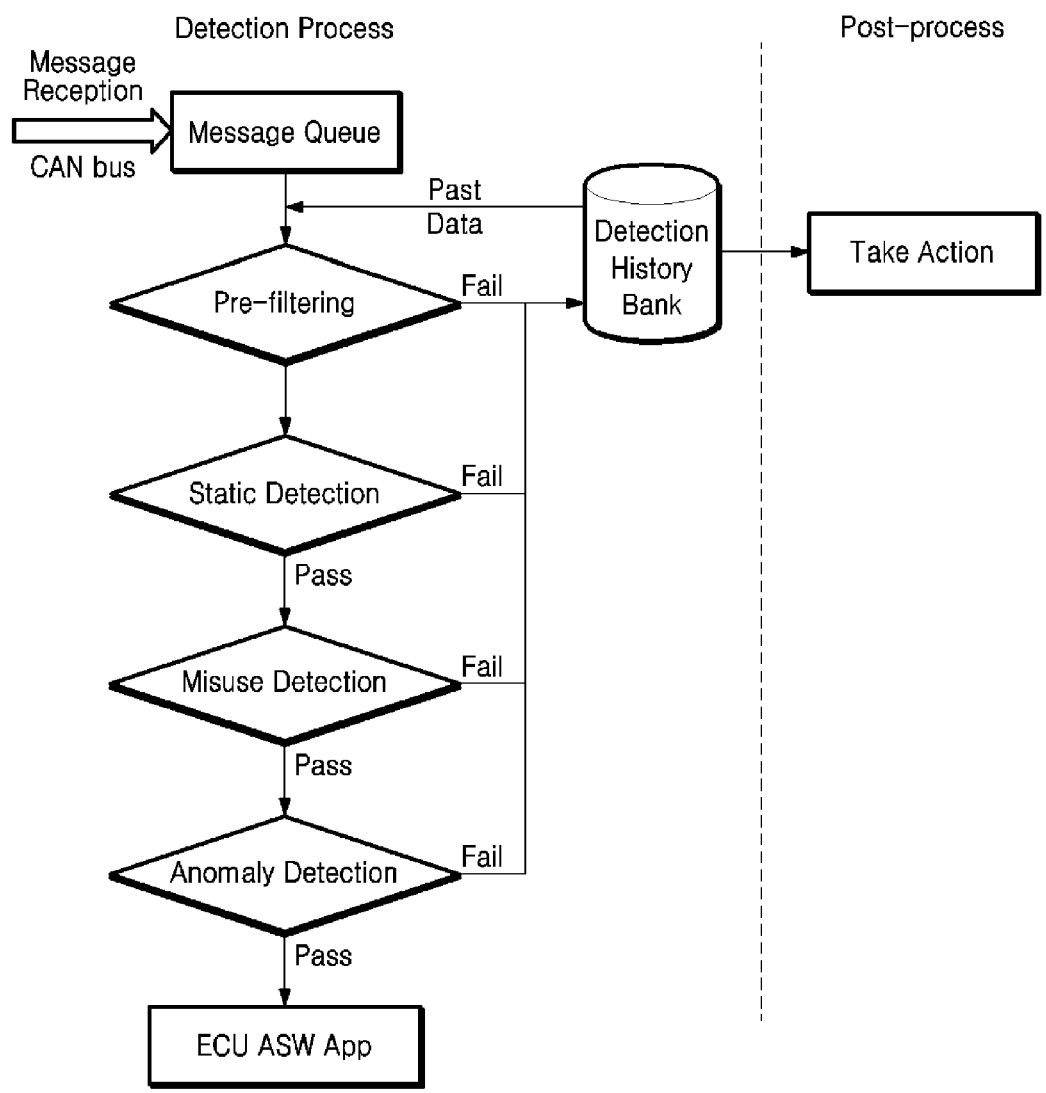
FIG. 3 is a conceptual diagram of a history-based detection process skip method according to at least one embodiment of the present disclosure.

FIG. 3 is a conceptual diagram illustrating a history-based detection process skip method according to at least one embodiment of the present disclosure. The IDPS (Intrusion Detection and Prevention System) executes a 'detection history bank', which is a database in which records are stored for messages (i.e., failed messages) determined as security threat messages while undergoing the static detection, misuse detection, and anomaly detection steps. The IDPS performs pre-filtering with the detection history bank prior to performing the detection process composed of the existing three steps for newly incoming messages.

In pre-filtering, the IDPS compares the new message to records stored in the detection history bank or database to determine if the new message is the same or similar message as a pre-detected security threat message. In response to determining that the new message is the same or similar message as the pre-detected security threat message, the IDPS skips the performance of the existing three-step detection process with respect to the new message and enters the blocking action phase right after storing the record for the new message in the detection history bank. In other words, in response to determining a new message is the same or similar message as the pre-detected security threat message, the new message is considered a network message associated with the security threat. Skipping the application of unnecessary detection techniques can improve the throughput of the entire system by increasing the overall operation speed. As described below, the mention that the messages are the same is to be understood herein as indicating that they have the same message frame in its entirety at the bit level, and that the messages are similar as indicating that some fields that make up the message frame are the same at the bit level.

Various schemes may be employed to store a record for security threat messages in a detection history bank. As an example, when the storage space is sufficient, the entire frame of the security threat message may be stored in the detection history bank. In particular, the pre-filtering step may compare the entire bit stream when compared with the newly entered message, or may selectively compare some fields such as a data field, an arbitration field, and a control field within the frame. As another example, only some fields such as a data field, an arbitration field, and a control field in the frame of a security threat message may be selectively stored in the history bank.

In addition, to increase retrieval efficiency, the detection history bank may be operated as follows. For example, a unique counter may be assigned to each security threat message stored in the detection history bank. Whenever the newly detected security threat message is the same as or similar to the message already stored in the history bank, the counter of that message is incremented by one. Messages in the detection history bank may be sorted in descending order based on the counter value. Thus, in the detection history bank, a record of a security threat message frequently appearing in the vehicle network is placed on top, and a record of a security threat message infrequently appearing resides at a lower place. This improves the access speed to records stored in the detection history bank in pre-filtering.

Second Embodiment—Temporal Correlation-Based Adaptive Detection

Malicious attacks are likely to be attempted rather consecutively in a generally similar manner than in different manners of attack over time. Thus, when any of the three detection techniques described above have detected an attack message, the same detection technique is likely to succeed in detection even for subsequently attempted attack messages. Based on such temporal correlation, the present disclosure provides a technique for adaptively changing an application order of the detection techniques.

Figure 4:
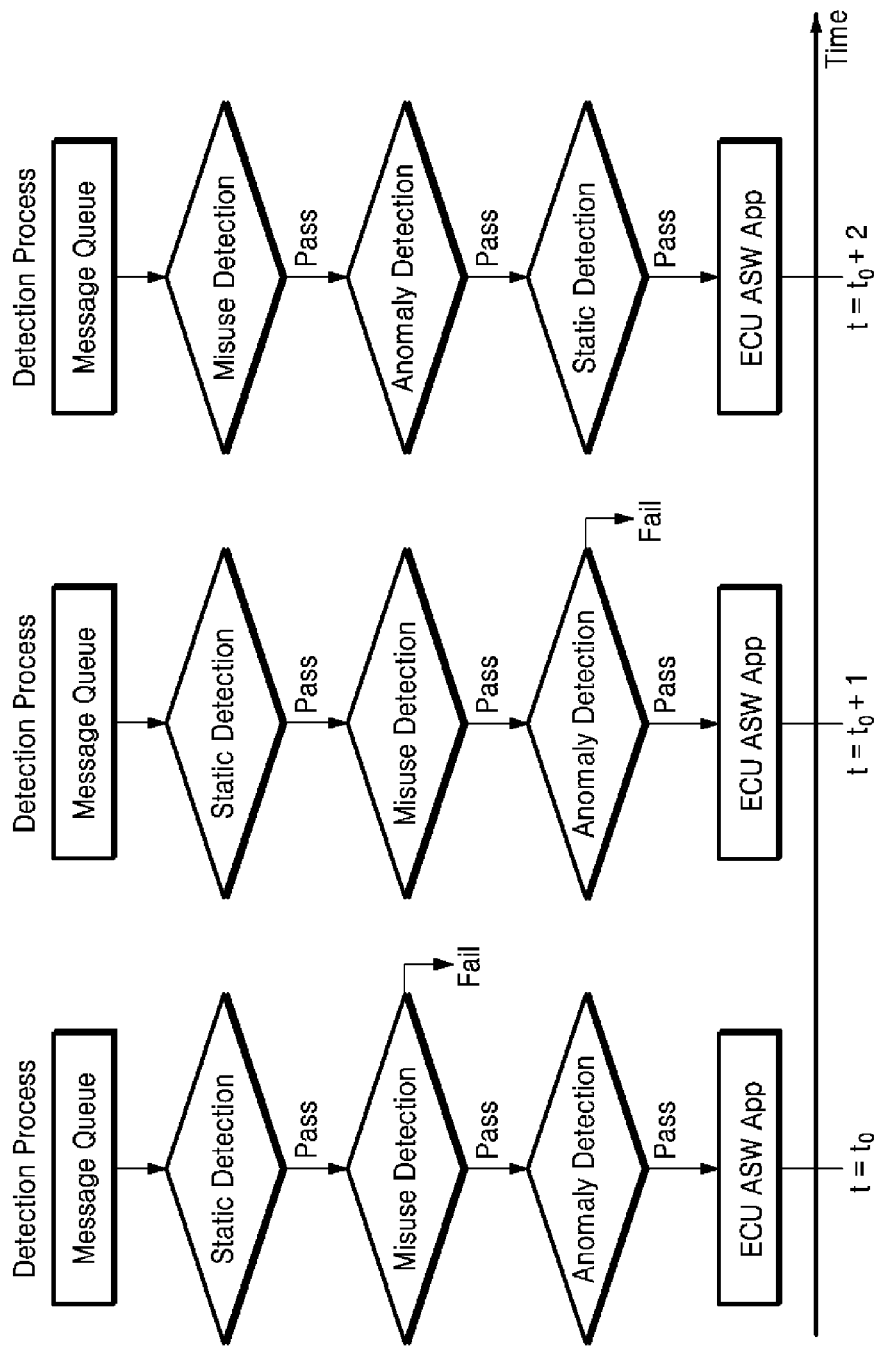
FIG. 4 is a conceptual diagram of an example technique for adaptively changing an application order of detection techniques according to at least one embodiment of the present disclosure.

FIG. 4 is a conceptual diagram of an example technique for adaptively changing an application order of detection techniques according to at least one embodiment of the present disclosure. As shown in FIG. 4, at $t=t_0$, with respect to the first message outputted from the message queue, the detection procedure is performed in the order of "static detection→misuse detection→anomaly detection." Assuming that the first message has been detected as an attack message in the misuse detection step, then, at $t=t_0+1$, with respect to the second message outputted from the message queue, the misuse detection technique is applied before the static detection technique. When the anomaly detection step detects the second message at $t=t_0+1$ as being the attack message, a new application order is provided at $t=t_0+2$ with positions switched between the anomaly detection technique and the static detection technique for application to a third message outputted from the message queue.

FIG. 4 illustrates a method based on the reversed order of application of the detection techniques depending on the technique that detected the security threat message at the previous timing, although the present disclosure envisions another method including assigning a count to each of multiple detection techniques, incrementing the associated counter whenever the detection succeeds in any detection technique, and aligning the application order of the detection techniques in descending order according to the accumulated value of the counter.

Third Embodiment—Parallel Process Detection Method

This method is applies, in parallel, instead of sequentially, a plurality of detection techniques. In other words, the detection speed is improved through parallel processing.

Figure 5:
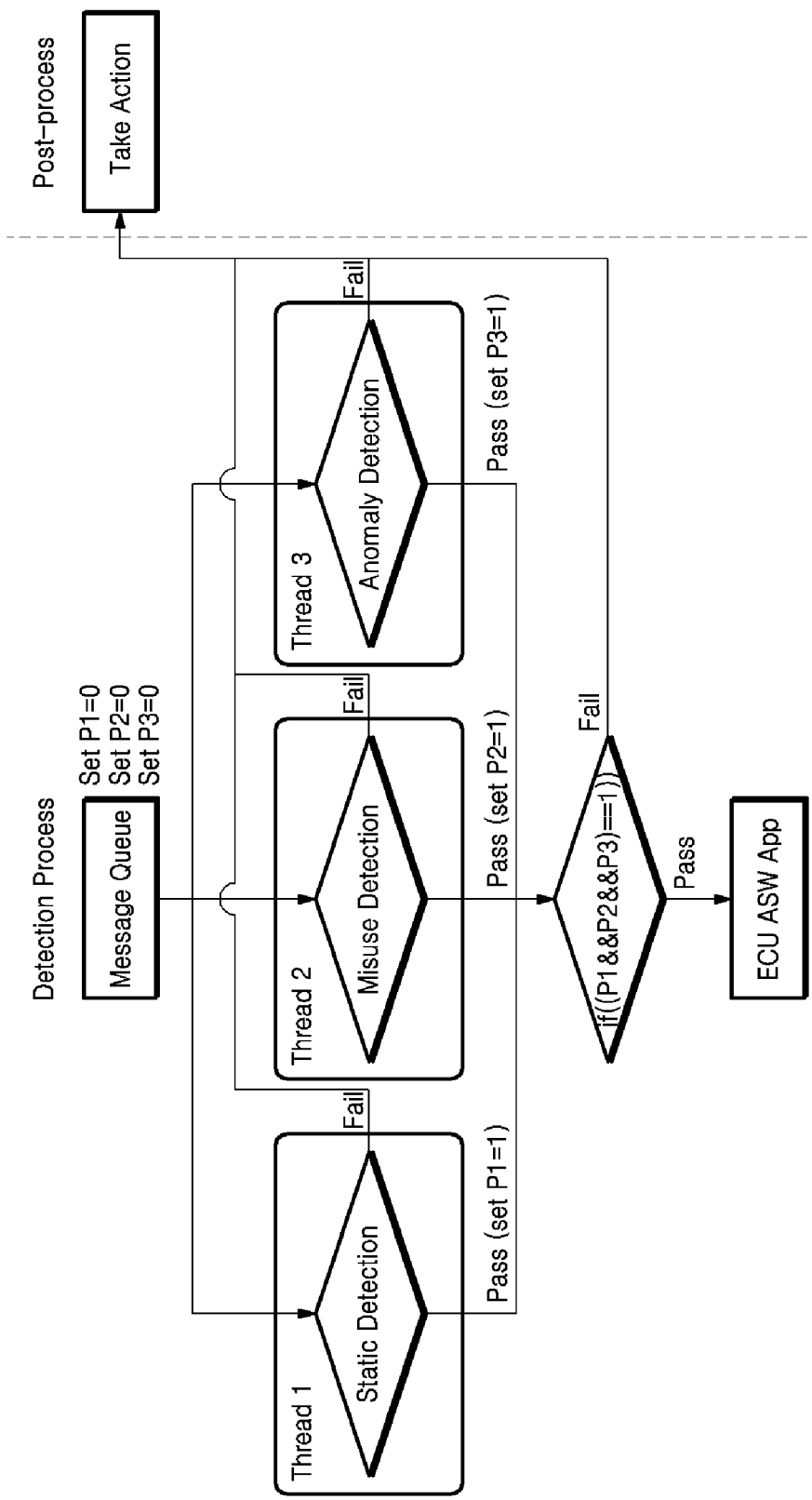
FIG. 5 is a conceptual diagram of a method of applying three different detection techniques in parallel, in accordance with at least one embodiment of the present disclosure.

FIG. 5 is a conceptual diagram of a method of applying three different detection techniques in parallel, in accordance with at least one embodiment of the present disclosure. As shown in FIG. 5, three threads using different detection techniques are executed concurrently, and the CAN message stored in the message queue is input to the three threads concurrently. This applies three different detection techniques in parallel to the CAN message. In the example of FIG. 5, thread 1 performs the static detection, thread 2 the misuse detection, and thread 3 the anomaly detection.

Upon passing through the detection techniques of all the threads, the CAN message is delivered to the ECU's application software component. When any one thread's detection technique fails to pass, the CAN message may be blocked from delivery to the ECU's application software component.

The three threads use different detection techniques, and they may have different processing speeds from each other. Thus, when any one thread results in a fail (i.e., when the CAN message fails to pass any one thread's detection technique), a configuration may be provided for terminating the operation of other threads and immediately entering a post process step to prevent waste of resources. Accordingly, the threads may be provided with signaling therebetween for stopping another thread, i.e., a channel for transmission of an interrupt signal.

The three threads may use parameters (or indicators) that inform the 'pass' or 'fail' of the processing CAN message. The three threads may set parameters P1, P2, and P3 to all zeros when a CAN message is input from the message queue. The respective threads may be responsive to when their own detection schemes pass the CAN message for setting the parameters Px to 1, respectively. After all the threads are finished, the CAN message may be transmitted to the application software component of the ECU only when all parameter Px values are 1.

With the parallel applications of different techniques to the CAN message, the entire detection process may be completed more rapidly than the sequential application method illustrated in FIG. 2, which allows a rapid management of the attack message.

Figure 6:
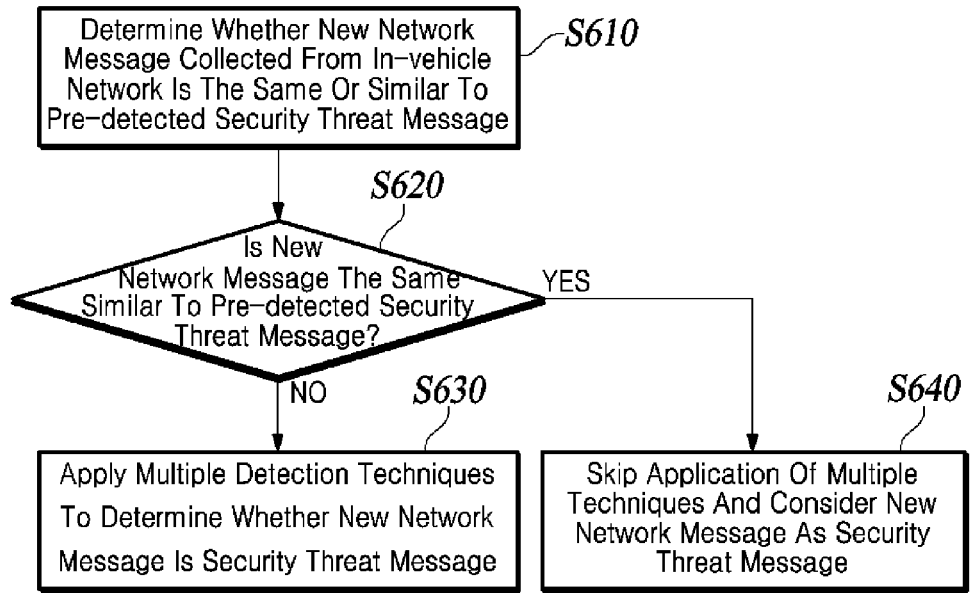
FIG. 6 is a flowchart of a method of operating an IDS or IDPS according to at least one embodiment of the present disclosure.

Hereinafter, methods of operating IDS or IDPS by employing the aforementioned methods will be described with reference to FIGS. 6 through 9. FIG. 6 is a flowchart of a method of operating IDS (Intrusion Detection System), or IDPS according to at least one embodiment of the present disclosure.

As shown in FIG. 6, the IDS determines whether a new network message collected from the in-vehicle network is the same or similar message as the network message pre-detected as being related to the security threat (S610). Accordingly, the IDS may query a database that has records of information identifying a pre-detected security threat message to determine whether the new network message has information corresponding to the information identifying the pre-detected security threat message. The information identifying the pre-detected security threat message may be the whole frame of the security threat message or a partial field of the same frame.

In response to determining that the new network message is not the same or similar message as the pre-detected security threat message ('NO' in S620), the IDS applies multiple detection techniques to the new network message to determine whether it is a network message associated with the security threat (S630). The multiple detection techniques include static detection, misuse detection, and anomaly detection. In response to determining that the new network message is the same or similar message as the pre-detected security threat message ('YES' in S620), the IDS skips application of the multiple detection techniques to the new network message, and immediately determines or considers the new network message as a network message associated with the security threat (S640).

Figure 7:
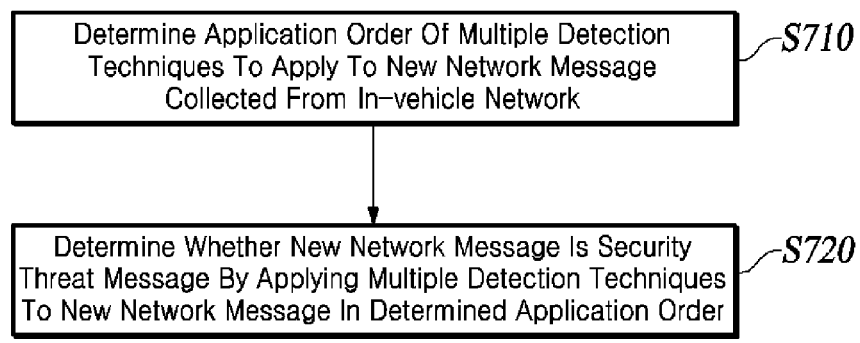
FIG. 7 is a flowchart of another method of operating an IDS or IDPS according to another embodiment of the present disclosure.

FIG. 7 is a flowchart of another method of operating an IDS (or IDPS) according to another embodiment of the present disclosure. As shown in FIG. 7, the IDS operates based on a detection success history of successful detection of a network message related to a security threat from among network messages collected from the in-vehicle network to determine an application order of the multiple detection techniques to be applied to a new network message collected from the in-vehicle network (S710). The multiple detection techniques include static detection, misuse detection, and anomaly detection. The IDS may change the application order of the multiple detection techniques such that a detection technique that was successful in detecting a network message associated with a security threat has priority over other detection techniques to apply to the network message. The IDS may count a cumulative number of times successful in detecting the network message related to a security threat for each of the multiple detection techniques, and may change the application order of the detection techniques in descending order of the cumulative numbers of times for respective ones of the multiple detection techniques.

The IDS is responsive to a new network message collected from the in-vehicle network for determining whether the new network message is a network message related to a security threat by applying the detection techniques in the determined application order (S720).

Figure 8:
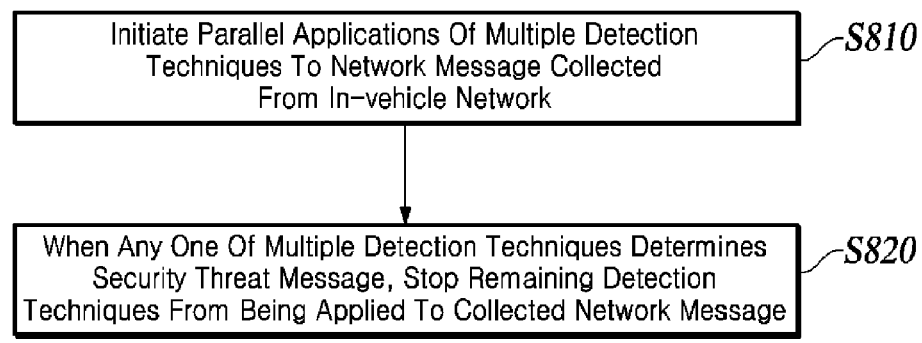
FIG. 8 is a flowchart of a method of operating an IDS or IDPS according to yet another embodiment of the present disclosure.

FIG. 8 is a flowchart of a method of operating an IDS (or IDPS) according to yet another embodiment of the present disclosure. The IDS initiates the application of multiple detection techniques in parallel with respect to a network message collected from the in-vehicle network (S810). This may be accomplished by, for example, concurrently executing a plurality of threads using different detection techniques and inputting the collected network message in the plurality of threads, respectively. The multiple detection techniques include static detection, misuse detection, and anomaly detection.

In response to any one of the multiple parallel-applied detection techniques determining the collected network message as a network message associated with a security threat, the IDS stops the remaining detection techniques from being applied to the collected network message (S820). Accordingly, as an example, the thread that determines the collected network message as the network message associated with the security threat transmits an interrupt signal to other threads, and the other threads terminate their execution in response to receiving the interrupt signal. In response to all of the multiple detection techniques determining that the network message is not a network message associated with a security threat, the IDS may allow the network message to be delivered to the application area.

The following describes various methods for implementing the IDPS or IDS in an Electronic Control Unit (ECU) having a software architecture based on an AUTOSAR (Automotive Open Plan System Architecture).

Figure 9:
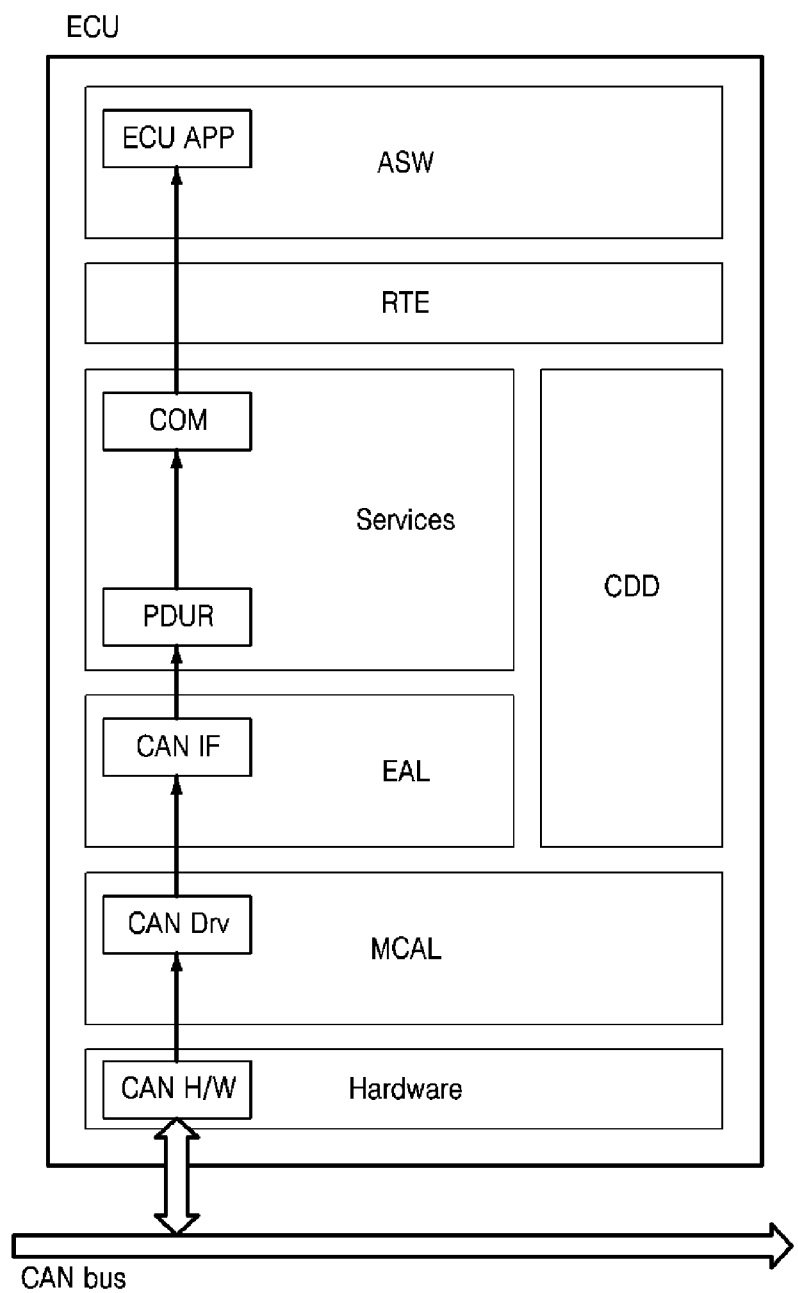
FIG. 9 is a schematic diagram of an Automotive Open System Architecture or AUTOSAR-based software architecture.

First, referring to FIG. 9, an AUTOSAR-based software architecture of an ECU will be briefly described. FIG. 9 is a schematic diagram of an AUTOSAR-based software architecture. The software architecture of the AUTOSAR has a layered structure divided into an application software (ASW) layer, a run time environment (RTE) layer, and a basic software (BSW) layer. In other words, by introducing the RTE concept for separating the application software from the hardware-related software, BSW, the hardware-independent application software may be developed. In particular, BSW includes a services layer, an ECU abstraction layer (EAL), a microcontroller abstraction layer (MCAL), and a complex device driver (CDD) layer.

The services layer includes modules that perform service functions such as a memory, a communication network, a system, and the like. In terms of communication network services, to provide a hardware independent unified interface against dependency on underlying communication hardware, there are modules such as a network manager (NM), a state manager (SM), a transport (TP), a diagnostic communication manager (DCOM), a communication (COM), and a protocol data unit or PDU router (PDUR) for a CAN/LIN/FlexRay communication network. In particular, the communication (COM) module is present in an upper layer of the PDUR module responsible for routing signals composed of messages, which provides the RTE with a unified communication method.

The MCAL area is a software module with hardware dependency, and includes a communication driver of an OSI data link layer, an analog-to-digital I/O rule driver such as an ADC, a PWM, and a DIO, a memory driver such as an EEPROM and a flash memory, a device driver of a peripheral micro controller, and the like. The CDD area is used in areas such as fuel injection of powertrain, electronic valve control, transmission control, etc. which are not standardized.

A set of modules involved in communication among the various modules forming each layer of basic software (BSW) is referred to as a communication stack (com-stack). For ease of understanding, FIG. 6 focuses on controller area network- or CAN-related modules out of the com-stack. The modules of the BSW, which are involved in the delivery of the CAN message, are a communication (COM), protocol data unit router (PDUR), CAN interface (CAN IF), CAN driver (CAN Drv) among others.

When the software component of the ASW layer, which is the ECU APP, transmits data to the network CAN, the data is transmitted from the CAN Drv to the CAN bus after passing through the RTE, COM, PDUR, and CAN IF. The transmitted data is received by the CAN Drv of all ECUs connected to the CAN bus, and the CAN Drv checks to see if it is supposed to receive the data by confirming the CAN ID (message ID), and if yes, and transmits the data to an application software component (ECU APP) through CAN IF, PDUR, COM, and RTE.

Various methods of installing IDPS (Intrusion Detection and Prevention System) for the AUTOSAR-based software architecture illustrated in FIG. 9 will now be described. The methods described below may be applied substantially identically to installing IDS (Intrusion Detection System).

The above-described static detection is performed on a message basis, and the misuse detection and anomaly detection are performed on a signal basis. In addition, the misuse detection and anomaly detection may be referred to as a dynamic detection as opposed to the static detection. In the following description, the terms 'static detection' and 'detection on a message basis' may be used interchangeably, and the terms 'dynamic detection' and 'detection on a signal basis' may be used interchangeably.

First Embodiment—Transmitting Blocking Signal after Parallel Detection

Figure 10:
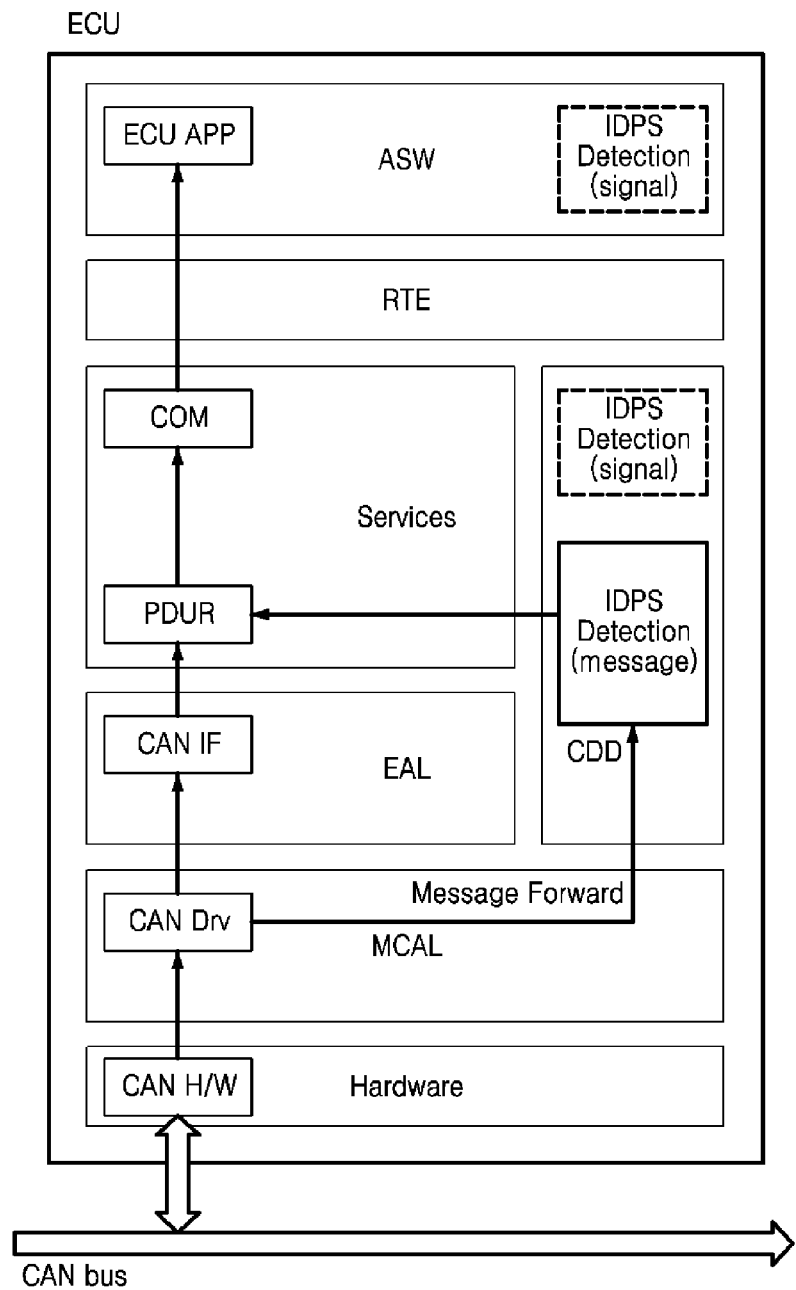
FIG. 10 is a schematic diagram of a software architecture of an ECU equipped with IDPSs according to at least one embodiment of the present disclosure.

FIG. 10 is a schematic diagram of a software architecture of an ECU equipped with IDPSs according to at least one embodiment of the present disclosure. As shown in FIG. 10, this embodiment has a CDD area installed with an IDPS module that performs static detection (detection on a message basis). Another IDPS module performing dynamic detection (detection on a signal basis) may be installed in the CDD area or an ASW area.

In this embodiment, the typical CAN message processing procedure on the com-stack is maintained, and the detection is started while delivering the CAN message from the CAN Drv in the MCAL area to the IDPS module in the CDD area. When a CAN message is delivered to the IDPS module in the CDD area, the IDPS module performs a static detection. When the CDD area includes a dynamic detection module of the IDPS, the static detection and dynamic detection may be performed concurrently. When the static and dynamic detections determine the CAN message as being a message related to a security threat, the IDPS module transmits a message blocking request signal to the PDUR module.

When the message blocking request signal arrives at the PDUR module before the CAN message is transferred from the CAN IF to the PDUR module according to the CAN message processing procedure, the CAN message may be blocked by the PDUR module. On the other hand, when the CAN message arrives earlier in the PDUR than the message blocking request signal, the CAN message is not blocked.

The method of the present embodiment maintains the CAN message processing procedure, which allows to block the security threat message without adding a delay to the CAN message processing procedure. However, this involves a substantial resource load in the CDD region for performing dynamic detection. There is also a need for an additional interface to transmit the message blocking request signal from the IDPS to the PDUR module. To block the security threat message, the message blocking request signal is supposed to appear first before the CAN message arrives at the PDUR module. Therefore, an extended detection process may result in a failed blocking.

Second Embodiment—Parallel Detection-Only Method

Figure 11:
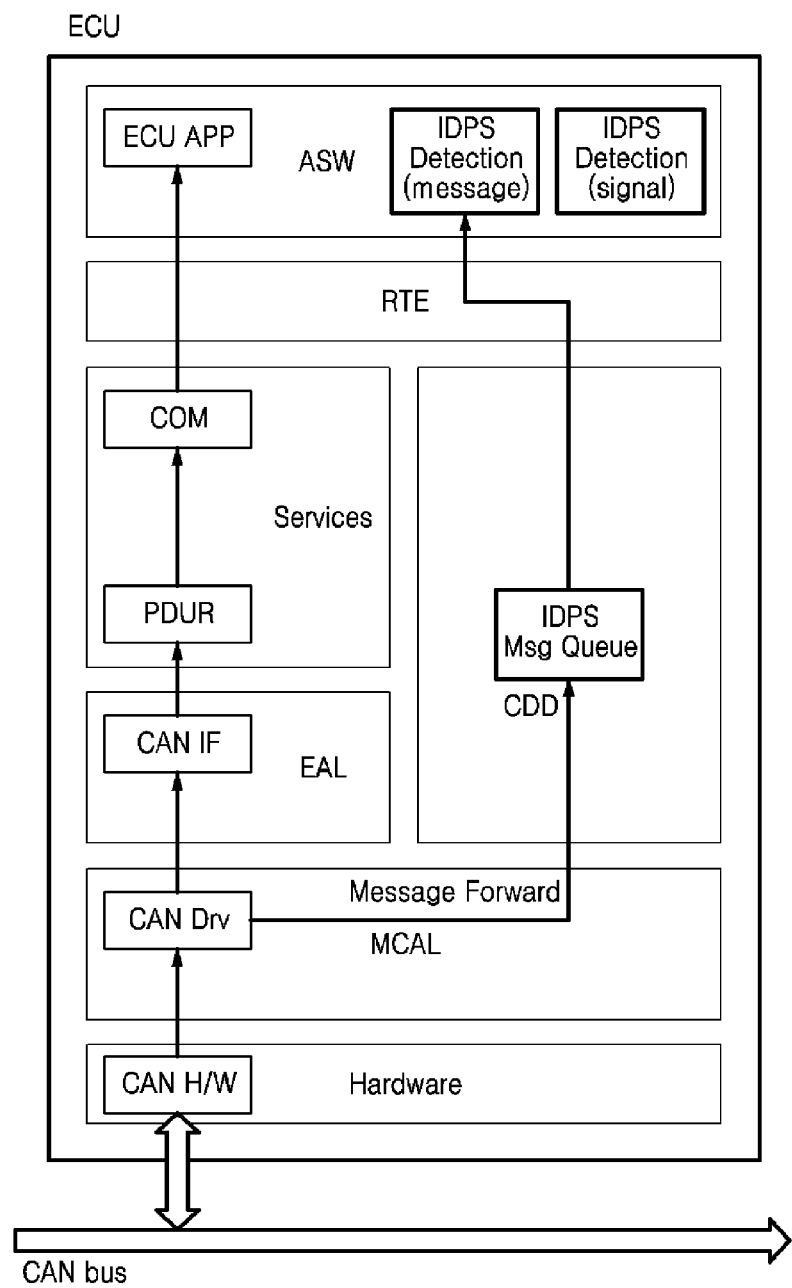
FIG. 11 is a schematic diagram of another software architecture of an ECU equipped with IDPSs according to another embodiment of the present disclosure.

FIG. 11 is a schematic diagram of another software architecture of an ECU equipped with IDPSs according to another embodiment of the present disclosure. As shown in FIG. 11, the present embodiment has a CDD area formed with an IDPS message queue in which CAN messages are queued, and an application software (ASW) area installed with IDPS detection modules for performing static detection and dynamic detection.

In this embodiment, a typical CAN message processing procedure on the com-stack is maintained, and a CAN message is transferred from a CAN driver in the MCAL area to an IDPS queuing module in the CDD area. When the CAN message is stored in the IDPS message queue, the IDPS detection modules in the ASW area receive the CAN message from the message queue and perform detection. The IDPS detection modules in the ASW area may concurrently perform static detection and dynamic detection. This method advantageously has no message delay, but it is dedicated to none other than detections.

Third Embodiment—Message Interrupt Blocking Scheme

Figure 12:
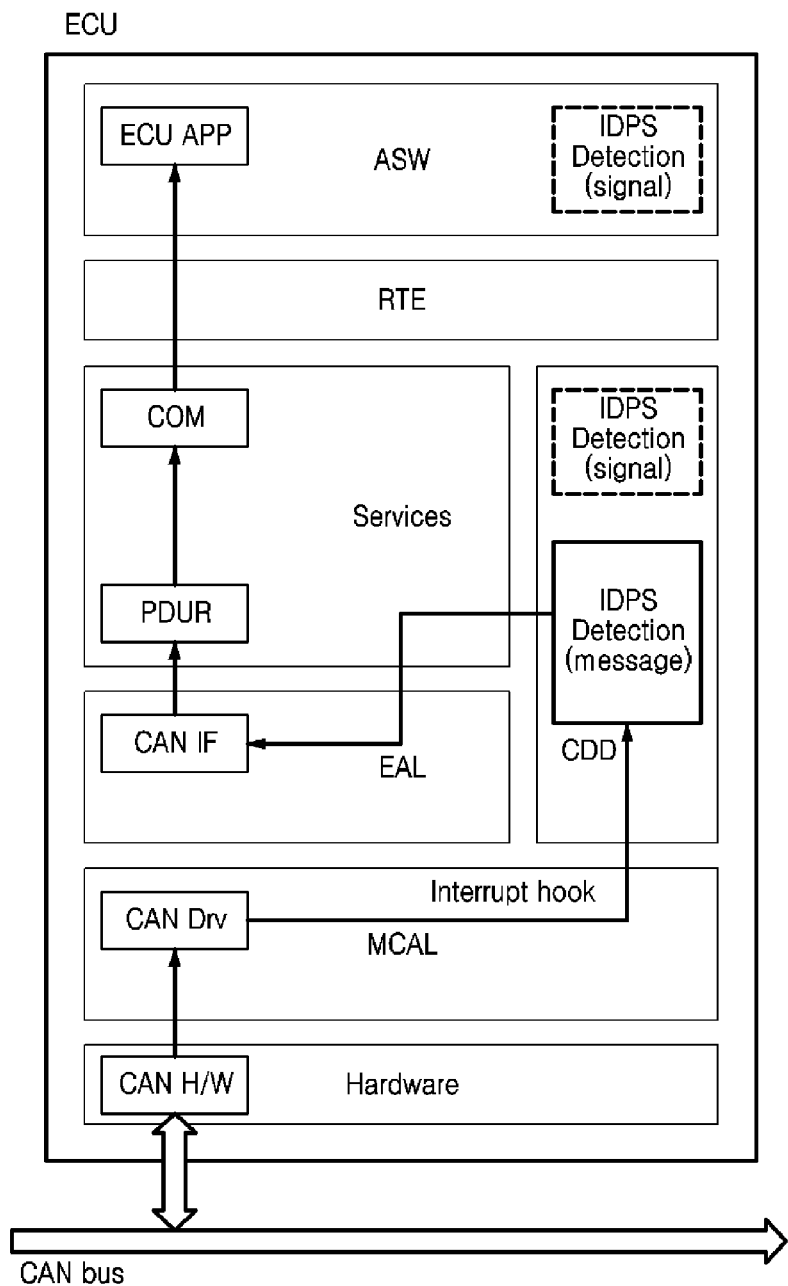
FIG. 12 is a schematic diagram of yet another software architecture of an ECU equipped with IDPSs according to yet another embodiment of the present disclosure.

FIG. 12 is a schematic diagram of yet another software architecture of an ECU equipped with IDPSs according to yet another embodiment of the present disclosure. In the present embodiment, in the CAN message processing procedure on the com-stack, detection starts when at least one IDPS in a CDD area interrupts a CAN message as being transmitted from a CAN Dry in an MCAL area to a CAN IF in an EAL area. In response to receiving the CAN message delivered, the IDPS detection module in the CDD area performs static detection. A dynamic detection module of the IDPS may be embedded in the CDD area or an ASW area, and where the CDD area includes the dynamic detection module of the IDPS, the CDD area may have both the static detection and dynamic detection performed therein. In response to detecting a security threat message in static and/or dynamic detection, the IDPS detection module does not deliver the CAN message to the CAN IF module in the EAL area. No transmission of the CAN message interrupts the existing CAN message processing procedure.

At least one embodiment of the present disclosure is advantageous with a high probability of successfully blocking a security threat message. However, a message delay occurs due to interrupt usage and an additional interface is needed for the CAN message delivery from the IDPS to the CAN IF. In addition, a dynamic detection can be performed in the CDD area, but with a substantial load involved.

Fourth Embodiment—Modifying AUTOSAR Module

Figure 13:
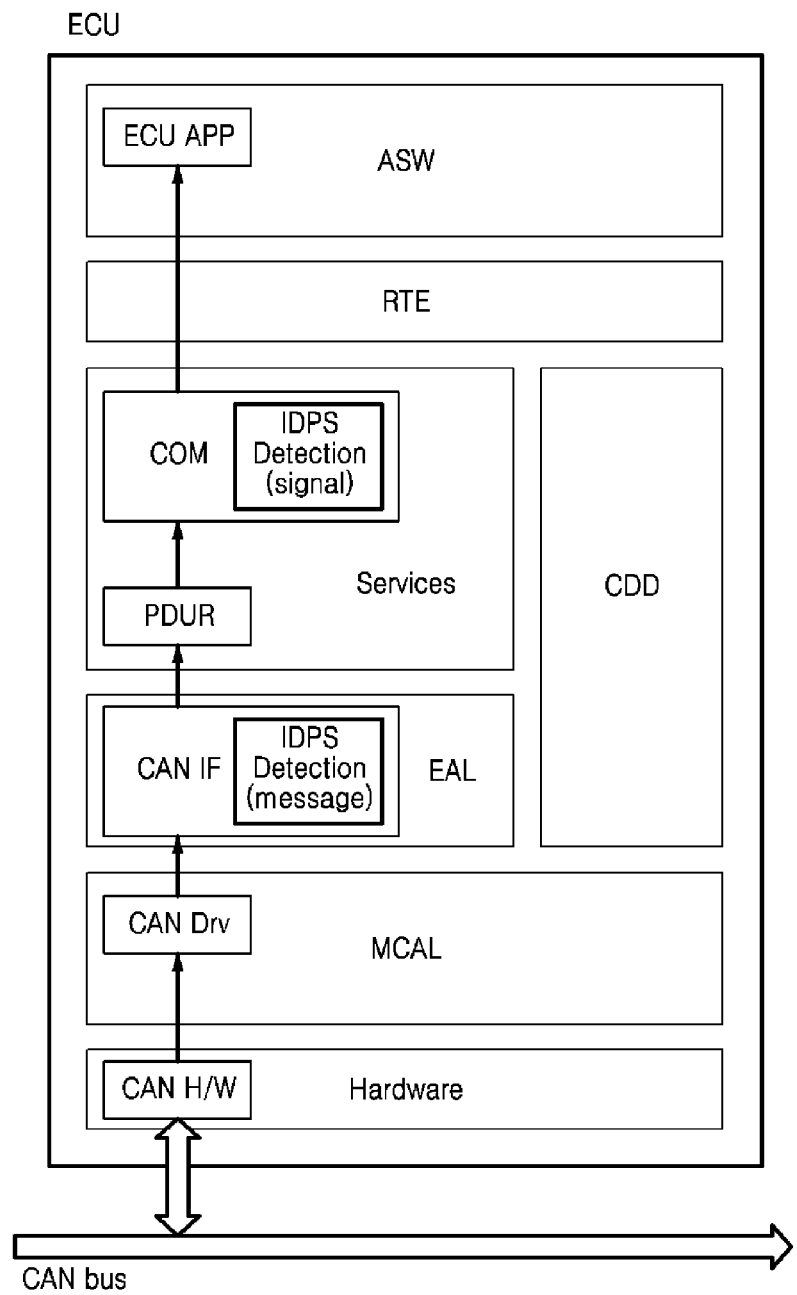
FIG. 13 is a schematic diagram of yet another software architecture of an ECU equipped with IDPSs according to yet another embodiment of the present disclosure.

FIG. 13 is a schematic diagram of yet another software architecture of an ECU equipped with IDPSs according to yet another embodiment of the present disclosure. In the present embodiment, static detection is performed in a CAN IF module defined in the existing AUTOSAR platform and dynamic detection is performed in a COM service module. This method modifies the standardized modules (i.e., CAN IF and COM) forming the com-stack of the AUTOSAR platform, and thus, unlike the case of using the CDD area, an interrupt is unnecessary, and detection and blocking of a security threat message may be performed. However, a delay may occur in the entire message processing procedure and a collaboration with associated parties is required for an IDPS module implementation within the standardized modules (i.e., CAN IF and COM) of the AUTOSAR platform.

Fifth Embodiment—Using Multi-Core-Dedicated Driver

Figure 14:
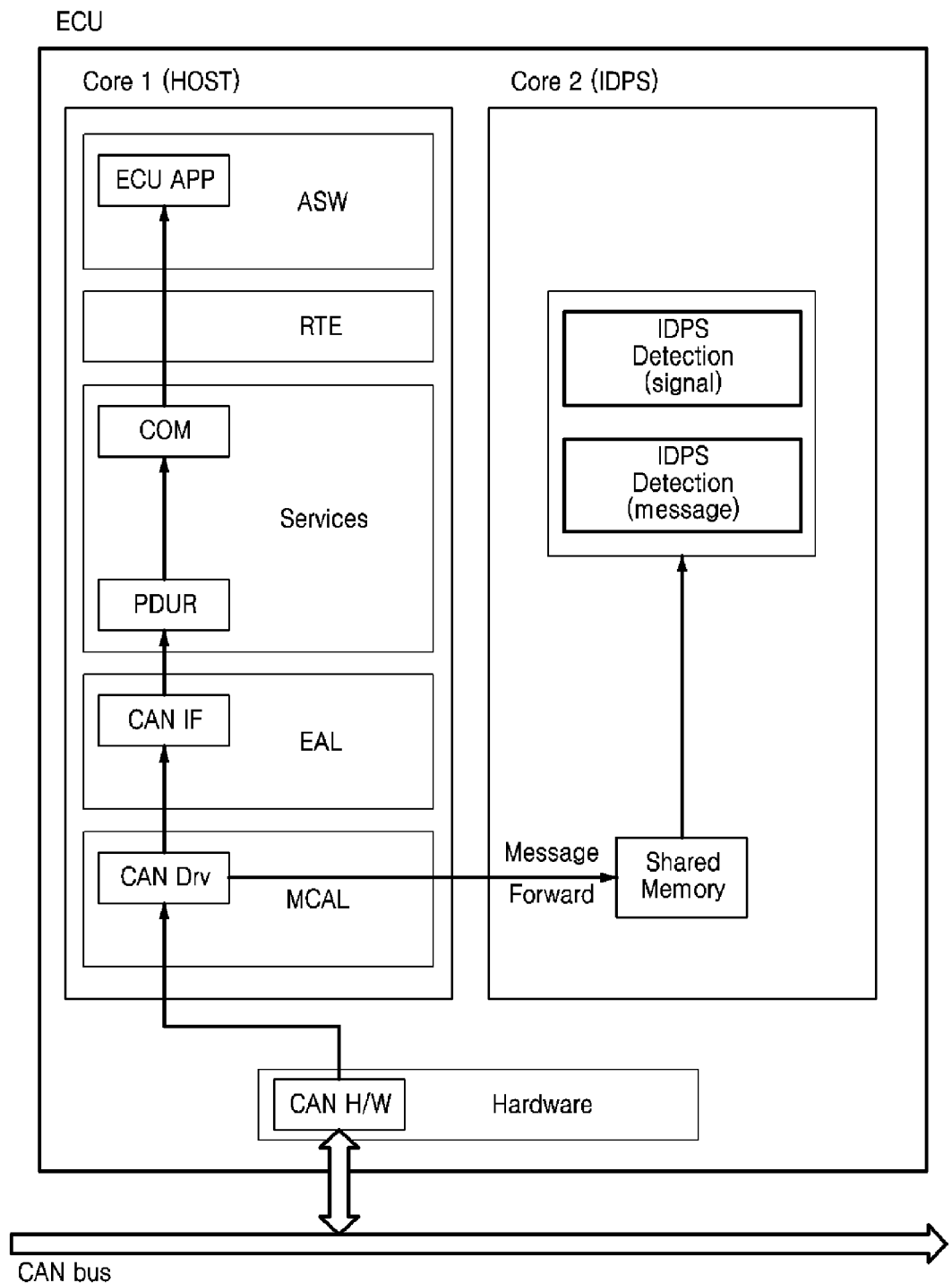
FIG. 14 is a schematic diagram of yet another software architecture of an ECU equipped with IDPSs according to yet another embodiment of the present disclosure.

FIG. 14 is a schematic diagram of yet another software architecture of an ECU equipped with IDPSs according to yet another embodiment of the present disclosure. In this embodiment, the CAN message processing procedure on the com-stack proceeds as is, and detection starts while transferring the CAN message from a CAN Dry in an MCAL area to a shared memory of an IDPS-dedicated core (second core). In response to receiving a CAN message delivered, IDPSs perform static detection and dynamic detection (concurrently). An advantage of the present embodiment is that a delay is not added to the CAN message processing procedure and uses a separate core (second core) to reduce the load on the first core in which the existing CAN message processing procedure is performed. However, this method is high in price for implementation and is dedicated to none other than detections.

Sixth Embodiment—Blocking Security Threat Message Through Bit Stumping

Bit stumping may be used as a blocking method for invalidating a security threat message by forcibly transmitting a signal onto an existing occupied bus in response to detecting the security threat message and thereby causing a message frame error. The security threat message blocking method may be combined with the methods described with reference to FIGS. 10 through 14, respectively.

Figure 15:
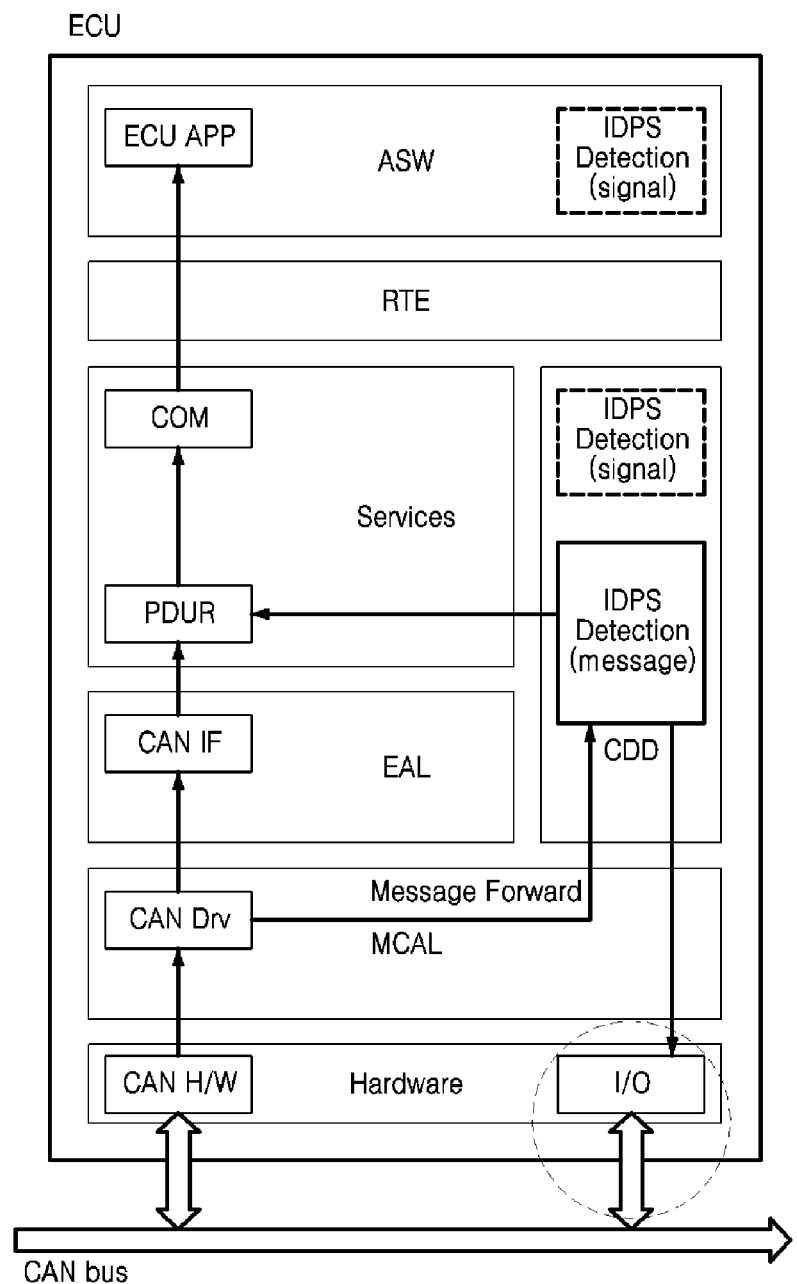
FIG. 15 illustrates a variation of the software architecture of FIG. 10 for applying a bit stumping.

FIG. 15 illustrates a variation of the software architecture (first embodiment) of FIG. 10 for applying a bit stumping. Using the bit stuffing requires, as shown in FIG. 15, additional hardware, e.g., I/O port connected from an IDPS to a CAN bus. It is to be understood that the illustrative embodiments described above may be implemented in many different ways. In some examples, the various methods, apparatuses, systems described in this disclosure may be implemented by or included in an electronic controller, a gateway, or the like having a processor, memory, communication interface, and the like. For example, the electronic controller may operate as an apparatus that executes the methods described above by loading software instructions into the processor and then executing the instructions to perform the functions described in this disclosure. In other words, the electronic controller may be specifically programmed to execute the functions.

The various methods described in this disclosure, on the other hand, may be implemented with instructions stored in a non-transitory recording medium that may be read and executed by one or more processors. The non-transitory recording medium includes, for example, all types of recording devices in which data is stored in a form readable by a computer system. By way of example, and not limitation, the non-transitory recording medium includes storage media such as erasable programmable read only memory (EPROM), electrically erasable programmable read-only memory (EEPROM), flash memory, optical drive, magnetic hard drive, solid state drive (SSD).

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof

What is claimed is:

1. A method of providing security to an in-vehicle network, the method performed by an electronic apparatus connected to the in-vehicle network, the method comprising:
    collecting a new network message from the in-vehicle network;
    determining an application order of multiple detection techniques to apply to the new network message based on a history detection of the multiple detection techniques applied to at least one network message previously collected from the in-vehicle network; and
    applying the multiple detection techniques to the new network message in a determined application order to determine whether the new network message is a security threat message;
    wherein the application order of the multiple detection techniques is determined such that a detection technique of the multiple detection techniques, which has succeeded in detecting the security threat message from the at least one previously collected network message, is performed prior to other detection techniques of the multiple detection techniques.

2. The method of claim 1, wherein the determining of the application order of the multiple detection techniques includes:
    counting a cumulative number of times successful in detecting the security threat message for each of the multiple detection techniques; and
    changing the application order of the multiple detection techniques in descending order of cumulative numbers of times for respective ones of the multiple detection techniques.

3. The method of claim 1, wherein the multiple detection techniques include a static detection, a misuse detection, and an anomaly detection.

4. An electronic apparatus for providing security to an in-vehicle network, comprising:
    one or more processors; and
    a memory in which instructions are stored, wherein the instructions, when executed by the one or more processors, cause the electronic apparatus to perform the steps of:
        collect a new network message from the in-vehicle network;
        determine an application order of multiple detection techniques to apply to the new network message collected from the in-vehicle network based on a history of detection of the multiple detection techniques applied to at least one network message previously collected from the in-vehicle network; and
        apply the multiple detection techniques to the new network message in a determined application order to determine whether the new network message is a security threat message,
    wherein the application order of the multiple detection techniques is determined such that a detection technique, which has succeeded in detecting the security threat message from the at least one previously collected network message, is performed prior to other detection techniques.

5. The electronic apparatus of claim 4, wherein the determining of the application order of the multiple detection techniques includes:
    counting a cumulative number of times successful in detecting the security threat message for each of the multiple detection techniques; and
    changing the application order of the multiple detection techniques in descending order of cumulative numbers of times for respective ones of the multiple detection techniques.

6. The electronic apparatus of claim 4, wherein the multiple detection techniques include a static detection, a misuse detection, and an anomaly detection.

* * * * *